US011819958B2

(12) United States Patent
Plasch

(10) Patent No.: US 11,819,958 B2
(45) Date of Patent: Nov. 21, 2023

(54) BUILD-UP WELDING METHOD

(71) Applicant: Siegfried Plasch, Wels (AT)

(72) Inventor: Siegfried Plasch, Wels (AT)

(*) Notice: Subject to any disclaimer, the term of this patent is extended or adjusted under 35 U.S.C. 154(b) by 465 days.

(21) Appl. No.: 15/774,068

(22) PCT Filed: Nov. 7, 2016

(86) PCT No.: PCT/EP2016/076889
§ 371 (c)(1),
(2) Date: Oct. 3, 2018

(87) PCT Pub. No.: WO2017/077132
PCT Pub. Date: May 11, 2017

(65) Prior Publication Data
US 2019/0111510 A1    Apr. 18, 2019

(30) Foreign Application Priority Data
Nov. 6, 2015    (EP) .................................... 15193560

(51) Int. Cl.
*B23K 9/04*    (2006.01)
*B23K 9/12*    (2006.01)
*B23K 9/167*    (2006.01)
*B23K 101/06*    (2006.01)

(52) U.S. Cl.
CPC .............. *B23K 9/048* (2013.01); *B23K 9/124* (2013.01); *B23K 9/167* (2013.01); *B23K 2101/06* (2018.08)

(58) Field of Classification Search
CPC ........ B23K 9/167; B23K 9/124; B23K 9/048; B23K 2101/06

USPC ..................................................... 219/76.15
See application file for complete search history.

(56) References Cited

U.S. PATENT DOCUMENTS

| 3,163,743 A | * | 12/1964 | Wroth ..................... | B23K 10/02 |
| | | | | 219/137 R |
| 3,209,119 A | * | 9/1965 | Keidel .................... | B23K 9/186 |
| | | | | 219/73.21 |
| 3,483,354 A | * | 12/1969 | Saenger, Jr. ........... | B23K 9/167 |
| | | | | 219/137 R |

(Continued)

FOREIGN PATENT DOCUMENTS

| DE | 3244774 A1 | 6/1983 |
| EP | 0313232 A1 | 4/1989 |

(Continued)

OTHER PUBLICATIONS

J.F. Rudy "Development and Application of Dabber Gas Tungsten Arc Welding for Repair of Aircraft Engine, Seal Teeth," ASME 1982 International Gas Turbine Conference and Exhibit.

(Continued)

*Primary Examiner* — Eric S Stapleton

(57) ABSTRACT

A build-up welding method is disclosed in which a welding torch is guided along a metallic workpiece and at least one melting wire serving as a build-up material is fed at an infeed speed into the arc between at least one non-melting electrode of the welding torch and the workpiece. In order to achieve a build-up welding method with higher build-up speeds in comparison to the prior art, it is proposed for the non-melting electrode positioned normal to the workpiece to be guided along the workpiece and for the fed wire to also be moved back and forth along its infeed direction.

9 Claims, 3 Drawing Sheets

(56) References Cited

U.S. PATENT DOCUMENTS

| | | | | |
|---|---|---|---|---|
| 3,496,327 A * | 2/1970 | Vilkas | B23K 9/007 219/127 |
| 3,573,420 A * | 4/1971 | Johnson | B23K 9/04 219/76.16 |
| 3,627,974 A * | 12/1971 | Normando | B23K 9/091 219/130.51 |
| 3,735,089 A * | 5/1973 | Sciaky | B23K 11/312 219/87 |
| 3,795,785 A * | 3/1974 | Smith | B23K 9/02 219/124.4 |
| 3,838,244 A * | 9/1974 | Petrides | B23K 9/0286 219/130.5 |
| 4,019,018 A * | 4/1977 | Oishi | B23K 9/167 219/137 R |
| 4,053,973 A * | 10/1977 | Meli | B23K 37/0531 29/252 |
| 4,159,410 A | 6/1979 | Cooper | |
| 4,179,059 A * | 12/1979 | Chang | B23K 9/0286 219/105 |
| 4,242,981 A * | 1/1981 | Bernard | B23K 9/048 118/318 |
| 4,296,306 A * | 10/1981 | Nomura | B23K 9/028 219/124.32 |
| 4,306,134 A * | 12/1981 | Slavens | B23K 37/0531 219/125.12 |
| 4,336,441 A * | 6/1982 | Godai | B23K 9/23 219/137 WM |
| 4,366,362 A * | 12/1982 | Ohta | B23K 9/167 219/123 |
| 4,436,974 A * | 3/1984 | Lebedev | B23K 11/0935 219/101 |
| 4,493,971 A * | 1/1985 | Nawa | B23K 9/167 219/136 |
| 4,531,040 A * | 7/1985 | Nawa | B23K 9/167 219/136 |
| 4,536,634 A * | 8/1985 | Nawa | B23K 9/296 219/136 |
| 4,698,484 A * | 10/1987 | Babcock | B23K 9/0956 219/124.34 |
| 4,801,781 A * | 1/1989 | Hori | B23K 9/1093 219/137.71 |
| 4,806,735 A * | 2/1989 | Ditschun | B23K 9/091 219/130.31 |
| 4,916,281 A * | 4/1990 | Flasche | B23K 9/0282 219/61 |
| 4,920,249 A * | 4/1990 | McLaughlin | B23K 9/0956 219/124.34 |
| 5,099,098 A * | 3/1992 | Burgoon | B23K 9/0286 219/125.11 |
| 5,107,093 A * | 4/1992 | Ekelof | B23K 9/1278 219/124.34 |
| 5,137,223 A * | 8/1992 | Brandon | B23K 15/002 226/187 |
| 5,166,495 A * | 11/1992 | Ekelof | B23K 9/127 219/124.34 |
| 5,361,972 A * | 11/1994 | Barker | B23K 9/32 228/219 |
| 5,442,155 A * | 8/1995 | Nihei | B23K 9/0956 219/124.34 |
| 5,535,938 A * | 7/1996 | Leduc | B23K 37/0531 228/212 |
| 5,578,227 A * | 11/1996 | Rabinovich | B23K 26/324 219/121.63 |
| 5,583,305 A * | 12/1996 | Hirsch | B23K 37/0531 73/865.8 |
| 5,669,547 A * | 9/1997 | Spring | B23K 9/164 228/219 |
| 5,756,966 A * | 5/1998 | Offer | B23K 9/0213 219/124.03 |
| 5,796,069 A * | 8/1998 | Jones | B23K 9/0282 219/121.64 |
| 5,892,199 A * | 4/1999 | Ahmed | B23K 9/28 219/137 R |
| 5,961,862 A * | 10/1999 | Lewis | B23K 26/144 219/121.63 |
| 5,996,878 A * | 12/1999 | LaCount | B23K 9/0282 228/25 |
| 6,044,769 A * | 4/2000 | Oka | F16L 55/179 104/138.2 |
| 6,060,678 A * | 5/2000 | Allford | B23K 9/048 219/60 R |
| 6,070,784 A * | 6/2000 | Holt | B23K 20/126 228/112.1 |
| 6,084,205 A * | 7/2000 | Sheaffer | B23K 9/0956 219/130.21 |
| 6,118,093 A * | 9/2000 | Hong | B23K 9/0734 219/61 |
| 6,127,651 A * | 10/2000 | Burgoon | B23K 9/1093 219/137 R |
| 6,143,378 A * | 11/2000 | Harwell | B33Y 10/00 427/597 |
| 6,193,145 B1 * | 2/2001 | Fournier | B23K 9/0213 228/262.41 |
| 6,365,867 B1 * | 4/2002 | Hooper | B23K 10/02 219/121.36 |
| 6,417,488 B1 * | 7/2002 | Takeuchi | B23K 9/0284 219/130.01 |
| 6,429,404 B1 * | 8/2002 | Suzuki | B23K 9/0216 219/124.34 |
| 6,469,277 B1 * | 10/2002 | Trube | B23K 26/1429 219/121.63 |
| 6,570,132 B1 * | 5/2003 | Brunner | B23K 9/1087 219/132 |
| 6,610,958 B2 * | 8/2003 | Stricklen | B23K 9/1336 219/75 |
| 6,627,839 B1 * | 9/2003 | Luckowski | B23K 9/1735 219/137 PS |
| 6,637,640 B1 * | 10/2003 | Sennett | B23K 9/325 228/44.3 |
| 6,834,556 B2 * | 12/2004 | Cain | G01M 3/002 73/861.24 |
| 7,009,139 B2 * | 3/2006 | Sonoda | B23K 26/348 219/121.64 |
| 7,011,244 B2 * | 3/2006 | Baylot | B23K 37/0533 228/114 |
| 7,012,217 B2 * | 3/2006 | Titze | B21C 37/122 219/121.63 |
| 8,471,173 B2 * | 6/2013 | Miessbacher | B23K 9/173 219/121.63 |
| 8,791,384 B2 * | 7/2014 | Wang | B23K 26/348 219/74 |
| 8,963,045 B2 * | 2/2015 | Peters | B23K 9/0953 219/130.1 |
| 9,018,563 B2 * | 4/2015 | Yamazaki | B23K 9/092 219/130.01 |
| 9,085,041 B2 * | 7/2015 | Peters | B23K 35/0261 |
| 9,095,922 B1 * | 8/2015 | Shearin | B23K 9/173 |
| 9,193,004 B2 * | 11/2015 | Enyedy | B23K 9/1093 |
| 9,233,432 B2 * | 1/2016 | Zhang | B23K 9/0953 |
| 9,321,116 B2 * | 4/2016 | Rose | B23K 9/022 |
| 9,339,886 B2 * | 5/2016 | Bowers | B23K 9/0284 |
| 9,481,931 B2 * | 11/2016 | Stempfer | B22F 3/1055 |
| 9,545,684 B2 * | 1/2017 | Dunahoo | B23K 9/1336 |
| 9,902,018 B2 * | 2/2018 | Voice | B23K 26/1476 |
| 9,962,785 B2 * | 5/2018 | Cole | B23K 9/0008 |
| 10,035,211 B2 * | 7/2018 | Peters | B23K 9/173 |
| 10,040,141 B2 * | 8/2018 | Rajagopalan | B23K 9/0956 |
| 10,086,465 B2 * | 10/2018 | Peters | B23K 9/1006 |
| 2002/0148113 A1 * | 10/2002 | Forrest | B82Y 10/00 29/847 |
| 2002/0158048 A1 * | 10/2002 | Stricklen | B23K 9/1336 219/75 |
| 2004/0050832 A1 * | 3/2004 | Mortendorfer | B23K 9/10 219/127 |
| 2004/0195212 A1 * | 10/2004 | Borne | B23K 9/291 219/75 |

(56) References Cited

U.S. PATENT DOCUMENTS

| | | | |
|---|---|---|---|
| 2004/0200881 A1* | 10/2004 | Gandy | F16L 9/17 228/103 |
| 2004/0232130 A1* | 11/2004 | Sonoda | B23K 26/348 219/137 R |
| 2004/0238496 A1* | 12/2004 | Kimura | B23K 9/1274 219/60 A |
| 2005/0173380 A1* | 8/2005 | Carbone | B23K 26/32 219/121.31 |
| 2006/0049153 A1* | 3/2006 | Cahoon | B23K 26/03 219/121.63 |
| 2007/0056944 A1* | 3/2007 | Artelsmair | B23K 9/092 219/130.5 |
| 2007/0102411 A1* | 5/2007 | Takano | B23K 9/0735 219/137.71 |
| 2007/0145028 A1* | 6/2007 | Artelsmair | B23K 26/348 219/137.71 |
| 2007/0151964 A1* | 7/2007 | Artelsmair | B23K 9/124 219/137.2 |
| 2007/0251927 A1* | 11/2007 | Miessbacher | B23K 35/28 219/121.63 |
| 2008/0078812 A1* | 4/2008 | Peters | B23K 9/0956 228/101 |
| 2008/0190900 A1* | 8/2008 | Zhang | B23K 9/1675 219/121.45 |
| 2008/0193218 A1* | 8/2008 | Verkuijl | B23K 37/0533 405/158 |
| 2008/0210677 A1* | 9/2008 | Nakamura | B23K 9/0213 219/137 R |
| 2009/0026188 A1* | 1/2009 | Schorghuber | B23K 9/124 219/137 PS |
| 2009/0107971 A1* | 4/2009 | Ruhrnossl | B23K 9/328 219/137.31 |
| 2009/0242534 A1* | 10/2009 | Artelsmair | B23K 9/0737 219/137 PS |
| 2009/0289044 A1* | 11/2009 | Fujiwara | B23K 9/067 219/137 R |
| 2010/0089890 A1* | 4/2010 | Manning | B23K 26/147 219/137.2 |
| 2010/0126969 A1* | 5/2010 | Klangos | B23K 9/325 219/75 |
| 2010/0159265 A1* | 6/2010 | Fairchild | C22C 38/02 428/586 |
| 2010/0301030 A1* | 12/2010 | Zhang | B23K 9/1675 219/130.1 |
| 2011/0114609 A1* | 5/2011 | Kroiss | B23K 9/133 219/121.11 |
| 2011/0132878 A1* | 6/2011 | Wang | B23K 26/348 219/74 |
| 2011/0259853 A1* | 10/2011 | Yamazaki | B23K 9/092 219/74 |
| 2011/0272383 A1* | 11/2011 | Jarvis | B23K 9/296 219/75 |
| 2011/0278274 A1* | 11/2011 | Rogers | B23K 9/167 219/137 R |
| 2011/0297658 A1* | 12/2011 | Peters | B23K 9/125 219/162 |
| 2012/0298628 A1* | 11/2012 | Bowers | F16L 13/02 219/61 |
| 2012/0305536 A1* | 12/2012 | Zhang | B23K 9/1675 219/137.7 |
| 2012/0325791 A1* | 12/2012 | Ash | B23K 9/0956 219/130.21 |
| 2013/0105450 A1* | 5/2013 | Waldhoer | B23K 26/348 219/121.64 |
| 2013/0146566 A1* | 6/2013 | Peters | B23K 26/342 219/61 |
| 2013/0253728 A1* | 9/2013 | Stumpfl | G05B 11/01 700/301 |
| 2013/0299475 A1* | 11/2013 | Aoki | B23K 9/0953 219/124.03 |
| 2014/0014638 A1* | 1/2014 | Artelsmair | B23K 9/0953 219/130.01 |
| 2014/0048970 A1* | 2/2014 | Batchelder | B33Y 30/00 264/129 |
| 2014/0263229 A1* | 9/2014 | Peters | B23K 9/1006 219/130.1 |
| 2014/0263230 A1* | 9/2014 | Peters | B23K 9/1043 219/130.1 |
| 2014/0326706 A1* | 11/2014 | Dunahoo | B23K 9/173 219/137.2 |
| 2015/0041441 A1* | 2/2015 | Klangos | B23K 9/167 219/75 |
| 2015/0165540 A1* | 6/2015 | Cole | B23K 9/0213 219/76.14 |
| 2015/0235565 A1* | 8/2015 | Postlethwaite | G09B 19/24 434/234 |
| 2015/0251275 A1* | 9/2015 | Denney | B23K 26/322 219/121.64 |
| 2015/0252631 A1* | 9/2015 | Miller | E21B 17/1085 175/325.1 |
| 2015/0283641 A1* | 10/2015 | Kim | B23K 9/0253 138/171 |
| 2017/0021442 A1* | 1/2017 | Denis | B23K 9/1043 |

FOREIGN PATENT DOCUMENTS

| | | |
|---|---|---|
| EP | 2644306 A1 | 10/2013 |
| EP | 2777858 A1 | 9/2014 |
| FR | 3012759 A3 | 5/2015 |

OTHER PUBLICATIONS

H. Lorenz "tigSpeed—Mehr als nur ein TIG schneller," Schweisstechnik/Soudure, May 2013, pp. 14-17 (with English translation).

Polysaude Nantes France SAS, "Mechanised TIG Cladding for industrial applications," 2011, pp. 1-48.

J.-P. Barthoux et al., "Focus on Nuclear Power Generation—Polysoude: Cladding in Industrial Applications", Jan. 2011, pp. 1-4.

Polysaude Nantes France SAS, "Solutions for Automated Cladding Operations, TIG—Cold Wire, Hot Wire used in the manufacturing and maintenance," Apr. 2014.

H.B. Cary, et al. "Modern Welding Technology," 2005, pp. 69-77, 630-631, 648-649, 653, 658.

* cited by examiner

BUILD-UP WELDING METHOD

FIELD OF THE INVENTION

The invention relates to a build-up welding method in which a welding torch is guided along a metallic workpiece and at least one melting wire serving as a build-up material is fed at an infeed speed into the arc between at least one non-melting electrode of the welding torch and the workpiece.

BACKGROUND OF THE INVENTION

In the prior art, there are known build-up welding methods carried out in the DIN EN ISO 6947-specified PC welding position (ASME: 2G) in which a welding torch (e.g.: WIG torch) is guided horizontally along a vertically oriented, fixed metallic workpiece (e.g.: a pipe). In this case, a wire (e.g.: hot wire) is fed at a continuous infeed speed into an arc, which is produced by a non-melting electrode (e.g.: tungsten electrode) positioned obliquely to the guidance direction of the welding torch, and is melted in order to achieve a welding build-up on the material. The guidance speed of such build-up welding methods, however, is sharply limited since an increase in the guidance speed results in a breakage of the welding bead. A simultaneous increase in the infeed speed of the wire likewise does not result in an improvement. On the other hand, an increase in the diameter of the non-melting electrode results in a more pronounced melting of the workpiece (a higher penetration depth) and thus in an undesirable mixing between the build-up material and the workpiece, which has a negative impact on the material properties of the build-up material. On the other hand, a guidance speed that is too slow results in the formation of a large molten puddle and accompanying formation of droplets.

SUMMARY OF THE INVENTION

The stated object of the invention is to increase the speed of the build-up welding method while simultaneously achieving a low penetration depth.

The invention attains the stated object in that the non-melting electrode, positioned normal to the workpiece, is guided along the workpiece and the fed wire is additionally moved back and forth along its infeed direction.

If the non-melting electrode, positioned normal to the workpiece, is guided along the workpiece, then it is possible to achieve a particularly homogeneous arc, which enables an improved, namely uniform, melting of the wire. In addition, through the placement of the non-melting electrode normal to the workpiece in a PC welding position, a capillary action on the melt can be achieved, advantageously making it possible to avoid a formation of droplets from the melt. If the fed wire is additionally moved back and forth along its infeed direction, then the penetration depth into the workpiece can be reduced in a controlled fashion. This achieves a reduced melting of the base material of the workpiece in comparison to the prior art, thus enabling particularly favorable prevention of an undesirable mixing of the base material with the build-up material. It is therefore possible to achieve a durable material build-up with a particularly good connection to the base material—with the least possible change in material properties of the build-up material. In addition, by means of the amplitude and frequency of the back-and-forth movement of the wire along its infeed direction, it is possible to regulate the temperature conditions in the melt in such a way that the ideal desired penetration depth is always achieved. The combination of the electrode positioned normal to the workpiece and the back-and-forth movement of the in-fed wire make it surprisingly possible to achieve outstandingly high build-up speeds in comparison to the prior art, with which it is possible to significantly outperform not only known build-up welding methods in the PC welding position, but also those in the PA welding position. In addition, the material properties of the build-up material can be retained despite the high guidance speed of the welding torch. It is thus possible to achieve a quicker, more reproducible build-up welding method.

In general, it should be noted that the build-up welding according to the invention can be particularly suitable for use in the DIN EN ISO 6947-specified PC welding position (ASME: 2G). In this case, the non-melting electrode of the welding torch is guided horizontally relative to a vertical workpiece. The primary guidance direction of the welding torch in this case is horizontal relative to the vertical workpiece. To apply a plurality of layers that are provided one on top of another, a secondary vertical guidance is also provided. In general, it is also noted that a build-up welding method (cladding) is understood to be a method for single-layer or multi-layer material build-up with overlapping welding beads on a workpiece with the aid of a welding torch. For example, a workpiece with a low-alloy base material can have a higher alloy build-up material applied onto it.

If the wire is additionally fed into the arc in advance in the guidance direction of the welding torch, a particularly advantageous capillary action of the melt can be produced—thus making it possible to further increase the above-mentioned advantages.

The process parameters in the build-up welding method can also be further improved to a significant degree if the wire is advanced in continuous fashion. In addition, this can also be useful for a homogenization of the molten puddle in connection with its back-and-forth movement. The material properties of the build-up material can thus be retained despite the high guidance speed of the welding torch, which can be used to achieve a high degree of purity of the build-up on the workpiece.

Particularly advantageous welding conditions can be achieved if the non-melting electrode has a diameter of at least 6.4 mm. The comparatively high electrode diameter relative to the prior art makes it possible to achieve particularly high guidance speeds of the welding torch, thus enabling an even more rapid process sequence. The use of such high electrode diameters is only enabled by the back-and-forth movement of the wire in its infeed direction since large electrode diameters usually necessitate high penetration depths. The movement of the wire according to the invention, however, can keep the penetration depth low even with high electrode diameters.

The build-up welding method according to the invention can particularly excel in its simplicity from a process engineering standpoint if the welding torch is guided along an outer cylindrical surface of a pipe.

It is particularly preferable that the build-up welding method according to the invention is suitable for applications in which the welding torch is guided along the inner cylindrical surface of the pipe.

If the welding torch is guided along the workpiece in a circular or serpentine fashion, then the build-up material can be built up in a plurality of layers situated one on top of another. According to the invention, it is thus possible to durably produce a flat material build-up in a simple way from a process engineering standpoint. The additional back-and-forth movement of the wire along its infeed direction according to the invention can also ensure a controlled production of a low penetration depth in the workpiece during the building up of additional layers—while nevertheless achieving a sufficiently high melting of the vertically underlying layer in order to achieve an advantageous connection between the layers. It is therefore possible to achieve a very homogeneous welding build-up with preferable material properties, thus enabling achievement of a particularly reproducible method.

In order to further increase the durability of the build-up welding method, the non-melting electrode can be embodied as a tungsten electrode.

Preferably, the welding torch is embodied as a WIG torch in order to thus achieve a comparatively high weld metal quality in the welded bead. This can further increase the reproducibility of the method.

If the melting wire is a hot wire, then it is possible to further increase the build-up performance in the method and thus the processing speed. The wire, which has a charge applied to it for example by a hot wire current source, can be thus specifically be fed into the arc in a heated fashion, which results in higher melting rates of the wire.

Preferably, the build-up welding method according to the invention is suitable for use in the PC welding position.

BRIEF DESCRIPTION OF THE DRAWINGS

In the figures, the subject of the invention is shown by way of example in one embodiment variant. In the drawings.

DETAILED DESCRIPTION OF THE PREFERRED EMBODIMENTS

Figure 1:
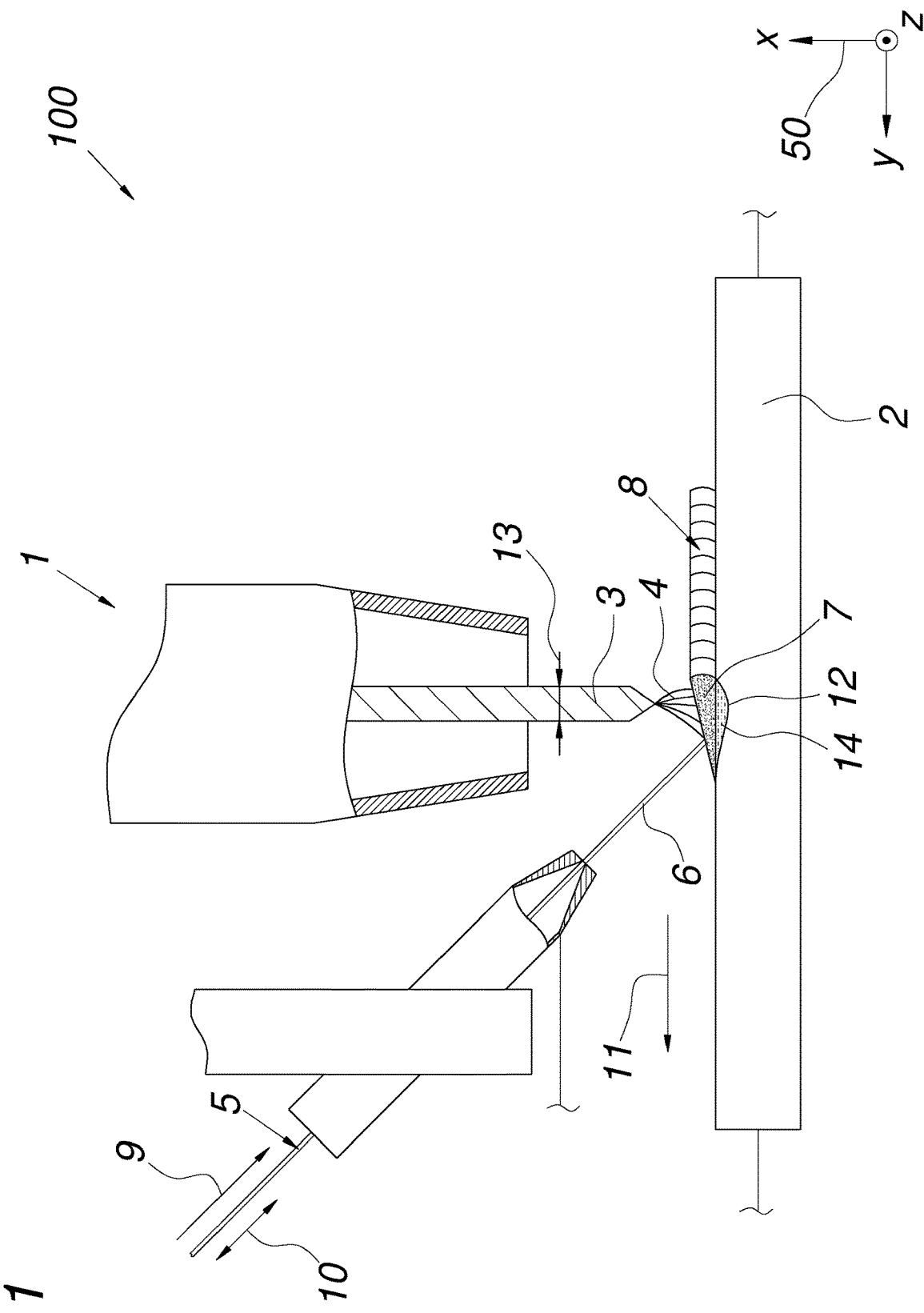
FIG. 1 shows a partially cut-away cross-section through a build-up welding method according to the invention, along the x/y plane.

FIG. 1 shows a build-up welding method 100 in the PC welding position. Such a build-up welding method 100 is often also referred to as a vertical build-up welding method. Other welding positions according to DIN EN ISO 6947 are also conceivable, for example PA or also H-LO45 (ASME: 6Gu). In this case, a welding torch 1, namely a WIG torch, is guided along a metallic workpiece 2. In addition to a WIG torch, it is also conceivable to use a MAG torch, etc. The coordinate system 50 shows the orientation of the workpiece 2 in space. Build-up welding is understood to mean that the workpiece is embodied in the y/z plane, i.e. a surface standing vertically in space, and the welding torch 1 is guided along the y axis, i.e. essentially in a horizontal direction. In this case, it is generally conceivable for this movement of the welding torch 1 in the guidance direction 11 to be superposed with an oscillating movement parallel to the workpiece 2, which has not been shown in detail.

Between a non-melting electrode 3, namely a tungsten electrode, of the welding torch 1 and the metallic workpiece 2, an arc 4 is produced, into which is fed a wire 5, namely in the form of a heated hot wire, serving as a build-up material 6 that is to be melted. The wire 5 can also be used in the form of a cold wire. The melted build-up material 6 produces a melt 7 on the workpiece 2 in order to form a welding bead 8. The wire 5 in this case is fed into the arc 4 at a continuous infeed speed. In addition to the continuous infeed speed 9, the wire 5 is moved back and forth along its infeed direction. For example, it is conceivable to use a back-and-forth movement of the wire 5 with a superposition amplitude of 4 to 12 mm.

Usually, a penetration depth 12 occurs primarily as a function of the diameter 13 of the non-melting electrode 3 and the guidance speed of the welding torch 1 relative to the workpiece. The back-and-forth movement 10 of the wire 5 regulates the penetration depth 12 in the workpiece 2 in such a way that with a simultaneous use of a non-melting electrode 3 with a large diameter 13 and a fast guidance speed, the penetration depth 12 remains low. As a result, it is possible to avoid an undesirable mixing of the build-up material 6 with the base material 14 of the workpiece 2. According to the invention, in the build-up welding method 1, the non-melting electrode 3 is positioned normal to the workpiece 2 and continuously moved across the workpiece 2 in the guidance direction 11 of the welding torch 1 in order to build up a spread-out welding bead 8 on the workpiece. In this case, the non-melting electrode 3 positioned normal to the workpiece 2 ensures production of a particularly homogeneous arc and thus a uniform, controlled melting of the wire 5.

Figure 2:
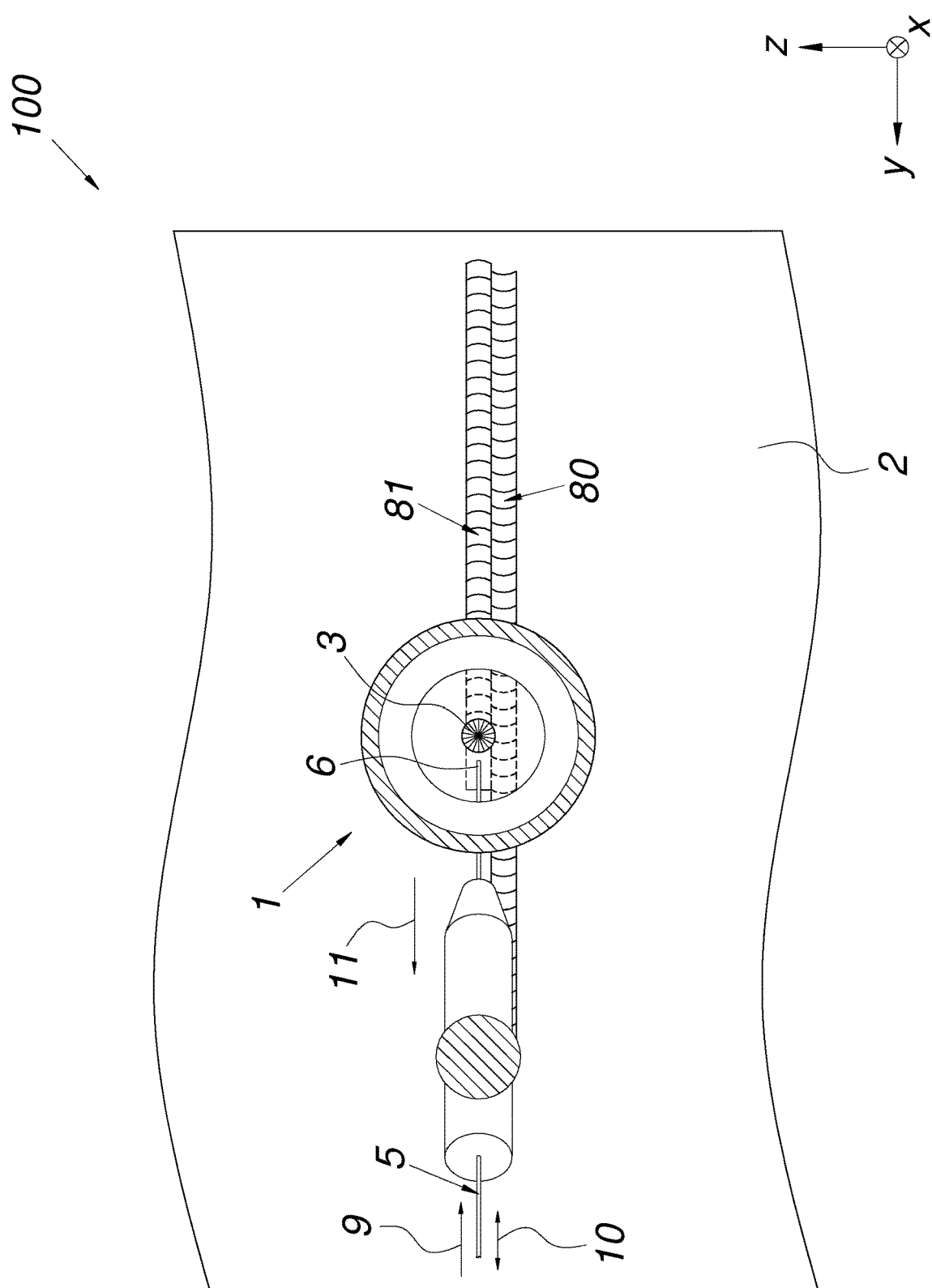
FIG. 2 shows a top view of the method according to the invention.

FIG. 2 shows a top view of the workpiece 2. It should be noted here that in the build-up welding method 1, a plurality of welding beads 80, 81 are built up on the workpiece 2 one above the other in the vertical direction and in overlapping fashion. The welding torch 1 is guided in serpentine fashion from bottom to top. Initially, the first welding bead 80 is produced, in particular from left to right, and the second welding bead 81 is produced over the first welding bead 80 in the reverse direction. A two-dimensional application can thus be achieved in a simple way from a process engineering standpoint.

As shown in FIG. 1 and FIG. 2, the wire 5 is additionally fed into the arc 4 in advance in the guidance direction 11 of the welding torch. This ensures a continuous and uniform supply of the build-up material 6 into the melt 7.

It has turned out to be particularly advantageous if the diameter 13 of the non-melting electrode 3 is at least 6.4 mm. It is thus specifically possible to achieve a high guidance speed of the welding torch 1 in the guidance direction 11.

Figure 3:
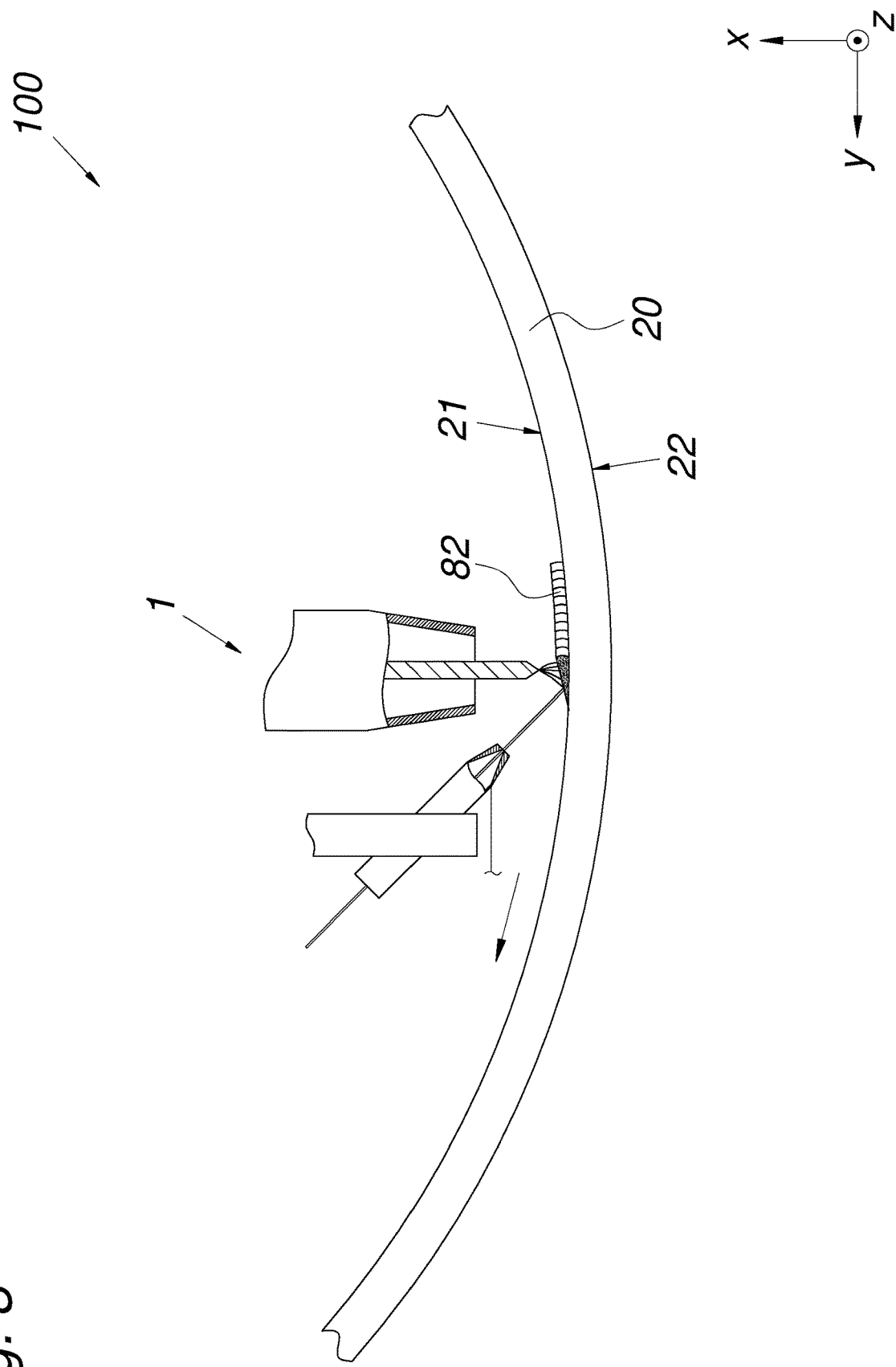
FIG. 3 shows a partially cut-away cross-section through a build-up welding method according to the invention on an outer cylindrical surface of a pipe.

FIG. 3 shows a build-up welding method 1 in which the welding torch 1 is guided in circular fashion around the inner cylindrical surface 21 of a vertical pipe 20. In this case, it is particularly possible to produce a closed annular welding bead 82 on the inner cylindrical surface 21. In addition, the welding torch 1 is likewise suitable for producing a welding bead on the outer cylindrical surface 22 of the pipe 20.

The invention claimed is:
1. A build-up welding method, comprising:
guiding a welding torch comprising at least one non-melting electrode along a metallic workpiece, wherein the at least one non-melting electrode is positioned normal to the workpiece; and
feeding at least one melting wire serving as a build-up material at an infeed speed into an arc in advance of the welding torch in a guidance direction of the welding torch between the at least one non-melting electrode of the welding torch and the workpiece, wherein, when feeding the melting wire continuously within the arc, the melting wire is moved back and forth along an infeed direction of the melting wire in a continuous feed to form a plurality of welding beads built up on the workpiece one next to the other and in overlapping fashion.

2. The build-up welding method according to claim 1, wherein the non-melting electrode has a diameter of at least 6.4 mm.

3. The build-up welding method according to claim 1, comprising guiding the welding torch along an outer cylindrical surface of a pipe.

4. The build-up welding method according to claim 3, comprising guiding the welding torch along an inner cylindrical surface of the pipe.

5. The build-up welding method according to claim 1, comprising guiding the welding torch along the workpiece in a circular or serpentine fashion.

6. The build-up welding method according to claim 1, wherein the non-melting electrode is a tungsten electrode.

7. The build-up welding method according to claim 1, wherein the welding torch is a WIG torch.

8. The build-up welding method according to claim 1, wherein the melting wire is a hot wire.

9. The build-up welding method according to claim 1, carried out in a PC welding position in which the workpiece is vertically oriented, and the welding torch is guided horizontally relative to the vertical workpiece.

* * * * *